July 14, 1925.  1,545,992
H. I. WRIGLEY
HAND BRAKE MECHANISM FOR RAILWAY CARS
Filed Jan. 13, 1923
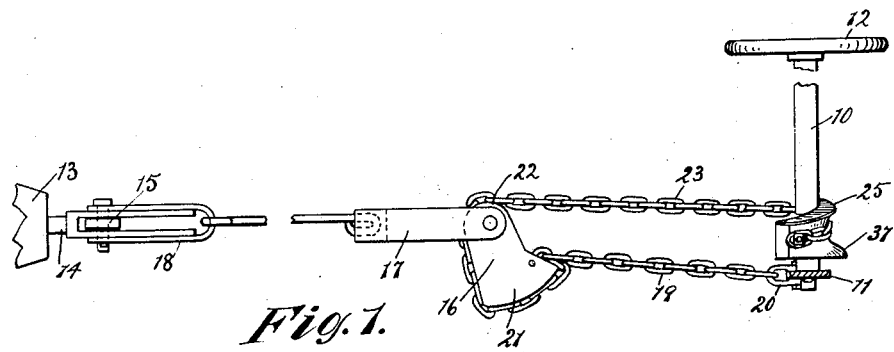
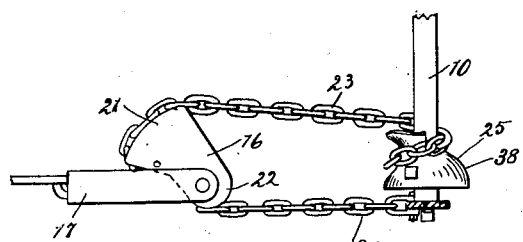
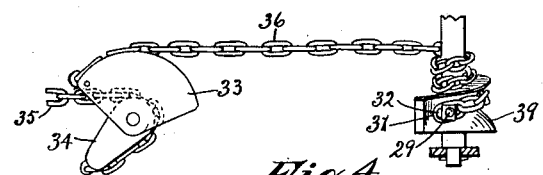
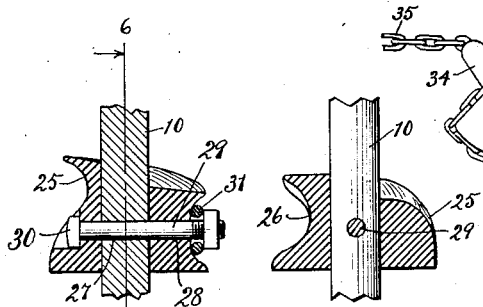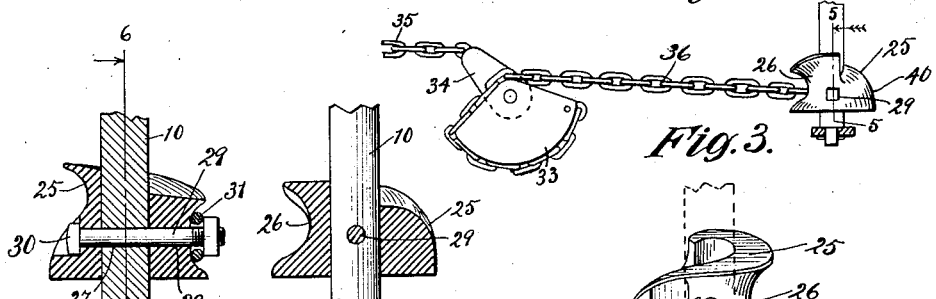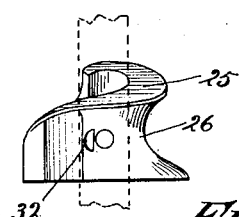
Inventor:
Henry I. Wrigley
By
Attys.

Patented July 14, 1925.

1,545,992

UNITED STATES PATENT OFFICE.

HENRY I. WRIGLEY, OF CHICAGO, ILLINOIS, ASSIGNOR TO UNIVERSAL DRAFT GEAR ATTACHMENT CO., A CORPORATION OF ILLINOIS.

HAND-BRAKE MECHANISM FOR RAILWAY CARS.

Application filed January 13, 1923. Serial No. 612,393.

*To all whom it may concern:*

Be it known that I, HENRY I. WRIGLEY, a citizen of the United States, and resident of Chicago, county of Cook, and State of Illinois, have invented certain new and useful Improvements in Hand-Brake Mechanism for Railway Cars, of which the following is a specification, and which are illustrated in the accompanying drawings, forming a part thereof.

This invention relates to hand brake mechanism for railway cars, and has for its principal objects to prevent the brake chain from stacking as it is wound on the brake staff and to enable the brake staff to quickly take up the slack in the mechanism.

Further objects and advantages of the invention will become apparent as the description is read in connection with the accompanying drawings illustrating selected embodiments of the invention, and in which Fig. 1 is a side elevation of a hand brake mechanism, made according to the invention;

Fig. 2 is a similar side elevation showing the parts in a position they assume during the application of the brakes;

Figs. 3 and 4 are similar views illustrating a brake mechanism of the same general kind, embodying a different form of lever;

Fig. 5 is a vertical section taken on the line 5—5 of Fig. 3;

Fig. 6 is a similar section taken on the line 6—6 of Fig. 5; and

Fig. 7 is an elevation showing the spiral drum on a fragment of the brake staff.

Referring to the drawings, the reference numeral 10 indicates a brake staff suitably journaled in brake step 11, or other support carried by the car frame and equipped at its upper end with a hand wheel 12, by which the staff is rotated to apply the brakes. A brake cylinder 13, is equipped with a push rod 14, by which the air pressure operates the brake lever 15 to apply the brakes. Between the brake staff 10 and the brake lever 15, is an extensible and contractable connection consisting chiefly of a sheave 16, a brake rod 17 in which the sheave is rotatably mounted, and which is connected by a shackle 18 to the brake lever, and a brake chain 19 running over said sheave, with one end anchored by the shackle 20 and the other end in winding engagement with the brake staff 10. The sheave shown in Figs. 1 and 2 is in the form of a reversing lever, having a long arm 21, and a short arm 22, both of which are equipped with peripheral working surfaces adapted to cooperate with the chain 19. The details of this particular sheave are set forth and claimed in my co-pending application, Serial No. 605,872, filed Dec. 9, 1922. It will be sufficient for the purposes of this case, to say that when the live end 23 of the brake chain is moved to the right in Figs. 1 and 2, it first acts upon the short arm 22 of the rotating lever, to quickly take up the slack, and afterwards it acts upon the long arm while the short arm is presented to the dead end 24, of the chain, in applying the braking pressure (see Fig. 2).

As the leverage of the sheave changes the point of application of the power changes, with the result that the point of engagement between the brake chain and the brake staff must vary in the same direction to prevent stacking of the chain. For this reason the live end of the chain is connected to the brake staff substantially in line with the point of application of the power to the sheave when the mechanism is slack and is made to wind spirally on the brake staff in a direction substantially parallel to the increase in the leverage presented by the sheave. Preferably, the brake staff is equipped with a drum, generally indicated by the reference numeral 25, which has a spiral groove 26, leading upwardly along the staff and preferably also decreasing in diameter as it rises. The live end of the brake chain first winds on this drum in the groove 26, and after the slack is all taken up it continues a spiral course upwardly on the brake staff, which presents very much shorter leverage than the drum 25.

The drum and the brake staff are provided with aligned openings 27 and 28, adapted to receive a bolt 29 which serves to secure the drum and the chain to the staff. The head of the bolt is countersunk as indicated at 30, and the opposite end passes through a link 31, in the live end of the chain which also receives a lug 32, projecting from the drum adjacent to the bolt. The purpose of this lug is to relieve the bolt of the side strain imposed by the chain when the brakes are applied.

In Figs. 3 and 4, another type of lever mechanism is shown, in which the brake staff first operates with relatively short leverage to take up the slack, and then operates with relatively longer leverage to apply the brakes. Reference numeral 33 indicates one arm of this lever, which, for convenience will be called a staff arm, and 34 indicates another arm that will be called the brake arm, by which the force of the brake staff is transmitted to the brake lever 15. The arm 33 first presents short leverage to the chain 36, as illustrated in Fig. 3, and after a suitable angle of rotation presents a long leverage, and the arm 34 first presents long leverage to the chain 35 and afterwards short leverage, as is shown in Figs. 3 and 4. Initially the drum 25 is in position to present its longest leverage to the chain 36 when the lever arm 33 is presenting its shortest leverage to the chain 36 and begins to wind directly on the staff 12 as the arm 33 begins to present its longest leverage to the chain.

In both forms of the device illustrated, the slack is taken up quickly at mechanical disadvantage, and then the braking pressure is applied with powerful mechanical advantage. At the same time, the brake chain is fed along the brake staff in a direction substantially parallel to the leverage of the multiplying devices which eliminates stacking.

As is indicated at 37, 38, 39 and 40 (Figs. 1, 2, 3 and 4) the walls of the groove 26 are so sloped that the chains will not catch or tend to climb out of the groove, but will be directed along the spiral extending in the illustration upwardly. While the invention has been illustrated in connection with leverage devices, that increase the leverage as the brakes are applied, it will be clear that certain features will be equally useful in hand brake mechanism that do not include a change of leverage.

I claim as my invention:

1. In a brake mechanism for railway cars, the combination of a brake staff, a rotatable lever adapted to rotate about a horizontal axis, a chain cooperating with said lever, and means for effecting a winding engagement between the chain and the brake staff at such a point that the chain will wind upwardly when the staff is rotated to compensate for the upward movement of said lever.

2. In a brake mechanism for railway cars, the combination of a brake staff, a brake chain, a rotatable lever adapted to present first a short arm and then a long arm to said chain, and means for connecting the chain to the staff, adapted to feed the chain spirally along the staff, parallel to the direction of the leverage increase.

3. In a brake mechanism for railway cars, the combination of a brake staff, a brake chain, a rotatable lever engaged with the chain and arranged to present increased leverage to the chain as it is rotated, and means for connecting the chain to the brake staff in position to cause the chain to wind spirally on the staff in a direction parallel to the increase in the leverage.

4. In a brake mechanism for railway cars, the combination of a brake staff, a brake chain, a sheave engaged with said chain and adapted to present increased leverage to the chain as it rotates and a spiral drum on said brake staff, adapted to present decreased leverage to the chain as the staff rotates, and serving to feed the chain along the staff in a direction substantially parallel to the increase in leverage of the sheave.

5. In a brake mechanism for railway cars, the combination of a brake staff, a drum thereon having a bolt opening and a stud adjacent thereto, a chain having a link engaged with the stud and a bolt in said opening and extending through the chain link engaged with the stud.

6. In a brake mechanism for railway cars, the combination of a brake staff, a brake chain, in winding engagement therewith, a brake rod member, a rotatable lever pivoted in one end of said member and adapted to present increased leverage to said chain as it rotates, and means on said brake staff adapted to present decreased leverage to the chain as the staff rotates.

HENRY I. WRIGLEY.